United States Patent
Na et al.

(10) Patent No.: US 10,760,679 B2
(45) Date of Patent: Sep. 1, 2020

(54) SHIFT-BY-WIRE SHIFTING CONTROL APPARATUS FOR VEHICLE

(71) Applicants: HYUNDAI MOTOR COMPANY, Seoul (KR); KIA MOTORS CORPORATION, Seoul (KR); SL Corporation, Siheung-si, Gyeonggi-do (KR)

(72) Inventors: Myung Lyul Na, Hwaseong-si (KR); Hee Soo Yang, Busan (KR); Sam Hoon Park, Daegu (KR)

(73) Assignees: HYUNDAI MOTOR COMPANY, Seoul (KR); KIA MOTORS CORPORATION, Seoul (KR); SL CORPORATION, Siheung-si, Gyeonggi-do (KR)

( * ) Notice: Subject to any disclaimer, the term of this patent is extended or adjusted under 35 U.S.C. 154(b) by 0 days.

(21) Appl. No.: 16/206,996

(22) Filed: Nov. 30, 2018

(65) Prior Publication Data

US 2020/0149628 A1 May 14, 2020

(30) Foreign Application Priority Data

Nov. 14, 2018 (KR) .......................... 10-2018-0140286

(51) Int. Cl.
*F16H 59/12* (2006.01)
*H01H 13/85* (2006.01)
*F16H 59/02* (2006.01)

(52) U.S. Cl.
CPC ............. *F16H 59/12* (2013.01); *H01H 13/85* (2013.01); *F16H 2059/026* (2013.01);
(Continued)

(58) Field of Classification Search
CPC .......................... F16H 59/12; H01H 2217/008
See application file for complete search history.

(56) References Cited

U.S. PATENT DOCUMENTS 5,152,392 A * 10/1992 Iwasa .................. H01H 13/705
200/517
6,295,887 B1 * 10/2001 DeJonge ................ B60K 37/06
74/473.3

(Continued)

FOREIGN PATENT DOCUMENTS

| JP | 2002-254950 A | 9/2002 |
|----|---------------|--------|
| JP | 2012-071649 A | 4/2012 |

(Continued)

*Primary Examiner* — Howard J Sanders
*Assistant Examiner* — Gregory T Prather
(74) *Attorney, Agent, or Firm* — Morgan, Lewis & Bockius LLP

(57) ABSTRACT

A shift-by-wire shifting control apparatus for a vehicle includes a housing, and a D-gear switch, an N-gear switch, and an R-gear switch installed in the housing. The D-gear switch corresponds to a drive gear, the N-gear switch corresponds to a neutral gear, and the R-gear switch corresponds to a reverse gear. A specific switch that is one of the D-gear switch, the N-gear switch, and the R-gear switch is movable from the first position to a third position between the first and second position by a first pressing force and is movable from the third position to the second positions by a second pressing force greater than the first pressing force.

15 Claims, 8 Drawing Sheets

(52) U.S. Cl.
CPC . *H01H 2215/004* (2013.01); *H01H 2217/006* (2013.01); *H01H 2217/008* (2013.01); *H01H 2221/026* (2013.01); *H01H 2221/08* (2013.01); *H01H 2231/026* (2013.01)

(56) References Cited

U.S. PATENT DOCUMENTS

| | | | |
|---|---|---|---|
| 9,970,531 | B2 | 5/2018 | Nakano |
| 10,605,354 | B2* | 3/2020 | Kim ................... F16H 59/0278 |
| 2015/0107971 | A1* | 4/2015 | Takeda .................. H01H 13/20 200/61.91 |
| 2015/0176699 | A1* | 6/2015 | Ishino .................... F16H 59/12 74/473.3 |
| 2015/0363006 | A1* | 12/2015 | Hsu ....................... G06F 3/0219 345/168 |
| 2017/0227118 | A1* | 8/2017 | Buttolo ............... F16H 59/0217 |
| 2017/0227119 | A1* | 8/2017 | Buttolo .................. F16H 59/12 |
| 2017/0274765 | A1* | 9/2017 | Woodhouse ........... B60K 20/08 |
| 2019/0145513 | A1* | 5/2019 | Ono ....................... F16H 59/12 |
| 2019/0257412 | A1* | 8/2019 | Sage ....................... F16H 59/12 |
| 2019/0323599 | A1* | 10/2019 | Moreno .................. H01H 9/06 |

FOREIGN PATENT DOCUMENTS

| | | |
|---|---|---|
| JP | 2013-159270 A | 8/2013 |
| JP | 5963857 B2 | 8/2016 |
| KR | 10-2017-0000007 A | 1/2017 |

* cited by examiner

SHIFT-BY-WIRE SHIFTING CONTROL APPARATUS FOR VEHICLE

CROSS-REFERENCE TO RELATED APPLICATION

This application is claims the benefit of priority to Korean Patent Application No. 10-2018-0140286, filed in the Korean Intellectual Property Office on Nov. 14, 2018, the entire contents of which are incorporated herein by reference.

TECHNICAL FIELD

The present disclosure relates to a shift-by-wire shifting control apparatus for a vehicle, and more particularly, relates to a shift-by-wire shifting control apparatus including a structure for preventing incorrect operation.

BACKGROUND

Recent vehicles tend to perform desired operations by converting various operating forces of a driver into electrical signals and transmitting the electrical signals to corresponding devices in accordance with the light weight trend for an improvement in fuel efficiency and the reliability enhancement of electronic control devices.

A shift-by-wire apparatus enables control of a transmission by a method of converting a driver's shifting operation into an electrical signal and transmitting the electrical signal to the transmission of the vehicle through an electric wire. Therefore, various types of mechanical parts no longer need to be used to transfer an operating status of a gearshift to the transmission, and thus the vehicle's structure may be simplified and the weight thereof may be reduced.

The shift-by-wire shifting control apparatus is less limited in arrangement or shape than a conventional mechanical shifting control apparatus. For example, the shift-by-wire shifting control apparatus may be implemented in a button or touch type to enable gear shifting by a simple operation. However, the shift-by-wire shifting control apparatus has a greater risk of incorrect operation than the conventional mechanical shifting control apparatus.

Accordingly, an improved structure for preventing incorrect operation of the shift-by-wire shifting control apparatus is required.

SUMMARY

The present disclosure has been made to solve the above-mentioned problems occurring in the prior art while advantages achieved by the prior art are maintained intact.

An aspect of the present disclosure provides a shift-by-wire shifting control apparatus for preventing incorrect operation.

Another aspect of the present disclosure provides a shift-by-wire shifting control apparatus for preventing incorrect operation with a relatively simple structure.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a shift-by-wire shifting control apparatus for a vehicle includes a housing, and a D-gear switch, an N-gear switch, and an R-gear switch installed in the housing. The D-gear switch corresponds to a drive gear, the N-gear switch corresponds to a neutral gear, and the R-gear switch corresponds to a reverse gear.

A specific switch that is one of the D-gear switch, the N-gear switch, and R-gear switch is movable between a first position and a second position. The specific switch is movable from the first position to a third position between the first and second positions by a first pressing force and is movable from the third position to the second position by a second pressing force greater than the first pressing force.

The specific switch may include a button assembly movable by a push operation, a first push deformation part compressively deformed by pushing the button assembly, and a second push deformation part compressively deformed by pushing the button assembly, the second push deformation part including a contact portion that conducts electricity upon the compressive deformation of the second push deformation part.

When the button assembly is pushed by the first pressing force, the first push deformation part may be compressively deformed and the second push deformation part may not be compressively deformed to a degree to which the contact portion conducts electricity. When the button assembly is pushed by the second pressing force, the second push deformation part may be compressively deformed to the degree to which the contact portion conducts electricity.

The third position may be a position of the specific switch in a state in which the first push deformation part is compressively deformed and the second push deformation part is not compressively deformed to the degree to which the contact portion conducts electricity. The second position may be a position of the specific switch in a state in which the first push deformation part is compressively deformed and the second push deformation part is compressively deformed to the degree to which the contact portion conducts electricity.

A signal for gear shifting to a specific gear corresponding to the specific switch may be generated when the contact portion of the second push deformation part conducts electricity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
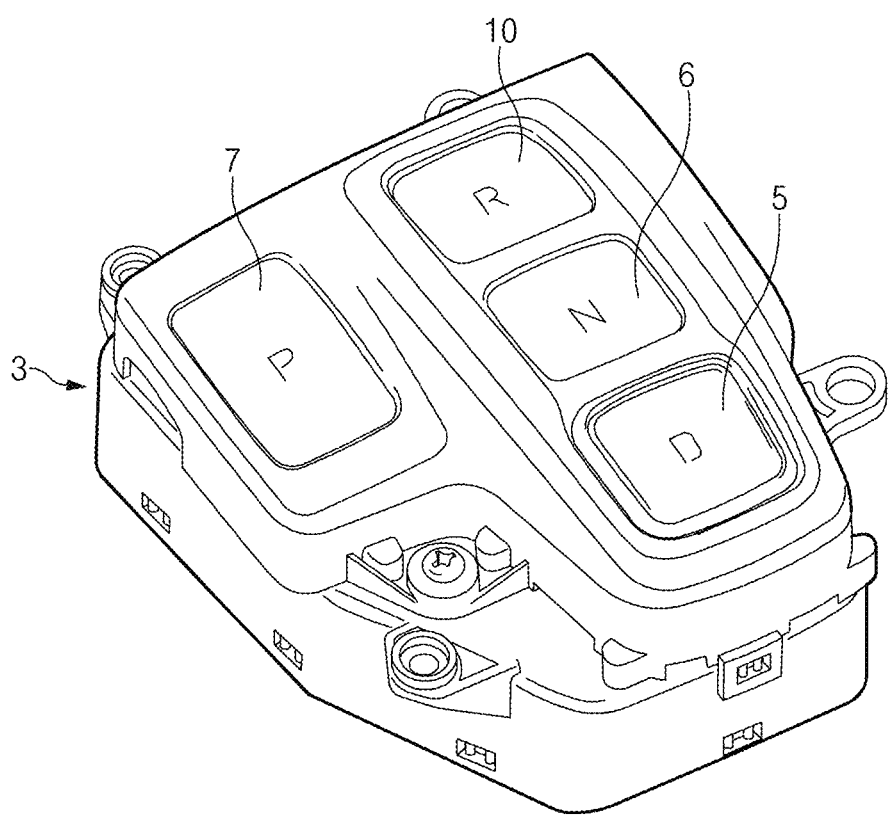
FIG. 1 is a perspective view illustrating a shift-by-wire shifting control apparatus for a vehicle according to an embodiment of the present disclosure.

Hereinafter, exemplary embodiments of the present disclosure will be described in detail with reference to the accompanying drawings. It should be understood that even if shown in different drawings, identical elements are provided with identical reference numerals in the drawings. Furthermore, in describing the embodiments of the present disclosure, detailed descriptions related to well-known functions or configurations will be omitted when they may make subject matters of the present disclosure unnecessarily obscure.

FIG. 1 is a perspective view illustrating a shift-by-wire shifting control apparatus for a vehicle according to an embodiment of the present disclosure.

The shift-by-wire shifting control apparatus 1 according to the embodiment of the present disclosure includes a housing 3, a D-gear switch 5, an N-gear switch 6, and an R-gear switch 10.

In recent years, vehicles using a shift-by-wire shifting control apparatus for electronically controlling gear shifting, instead of a mechanical gearshift, in a transmission system have been increased. The shift-by-wire shifting control apparatus may be implemented in various ways since the shift-by-wire shifting control apparatus is less limited in position or shape than the mechanical gearshift. However, there is a risk that a user familiar with a traditional operating method may incorrectly operate the shift-by-wire shifting control apparatus.

The embodiment of the present disclosure relates to a shift-by-wire shifting control apparatus for providing a differentiated feeling of operation when a specific gear is selected, thereby preventing incorrect operation. More specifically, the shift-by-wire shifting control apparatus 1 according to the embodiment of the present disclosure has a basic feature wherein the R-gear switch 10 is movable between a first position and a second position, and the R-gear switch 10 is pushed by a first pressing force to move from the first position to a third position that is a specific position between the first and second positions and is pushed by a second pressing force greater than the first pressing force to move from the third position to the second position.

However, unlike in this embodiment, the N-gear switch 6 or the D-gear switch 5 may be movable between a first position and a second position, and the N-gear switch 6 or the D-gear switch 5 may be pushed by a first pressing force to move from the first position to a third position that is a specific position between the first and second positions and may be pushed by a second pressing force greater than the first pressing force to move from the third position to the second position.

Features of the shift-by-wire shifting control apparatus 1 according to the embodiment of the present disclosure will be described below in more detail.

The housing 3 may form the external appearance of the shift-by-wire shifting control apparatus 1 and may have an inner space for accommodating the remaining components of the shift-by-wire shifting control apparatus 1. The housing 3 may be formed by combining upper and lower housings together.

The shift-by-wire shifting control apparatus 1 may be configured to enable selection of a drive gear, a neutral gear, or a reverse gear.

The shift-by-wire shifting control apparatus 1 may include the D-gear switch 5 corresponding to the drive gear, the N-gear switch 6 corresponding to the neutral gear, and the R-gear switch 10 corresponding to the reverse gear. Also, the shift-by-wire shifting control apparatus 1 may further include a P-gear switch 7 that is used for parking.

The D-gear switch 5, the N-gear switch 6, the R-gear switch 10, and the P-gear switch 7 may be installed in the housing 3 such that part of each switch is exposed outside the housing 3 for a push operation.

The D-gear switch 5, the N-gear switch 6, the R-gear switch 10, and the P-gear switch 7 may each include a button exposed above the housing 3 for a push operation.

The D-gear switch 5, the N-gear switch 6, the R-gear switch 10, and the P-gear switch 7 may each include a button cap that is curved downward. In the case where the button cap is curved upward, a user is more likely to incorrectly push an unintended switch in attempting to operate the shift-by-wire shifting control apparatus 1. In this embodiment, the D-gear switch 5, the N-gear switch 6, the R-gear switch 10, and the P-gear switch 7 may each include the button cap, the top side of which is concave downward, thereby reducing incorrect operation.

Referring to FIG. 1, the R-gear switch 10, the N-gear switch 6, and the D-gear switch 5 may be arranged in sequence from front to rear. This is intended to reduce a risk of incorrect operation and provide ease of operation to the user by arranging the switches as in a traditional shifting control apparatus.

The P-gear switch 7 may be disposed on a side, for example, the left side, of the R-, N-, and D-gear switches 10, 6, and 5 arranged in sequence from front or rear. The P-gear switch 7 may include a button larger than those of the D-gear switch 5, the N-gear switch 6, and the R-gear switch 10 and may provide a different feeling of operation than the D-gear switch 5, the N-gear switch 6, and the R-gear switch 10.

The housing 3 may have a shape including switch insertion openings into which the D-gear switch 5, the N-gear switch 6, the R-gear switch 10, and the P-gear switch 7 are inserted.

Figure 2:
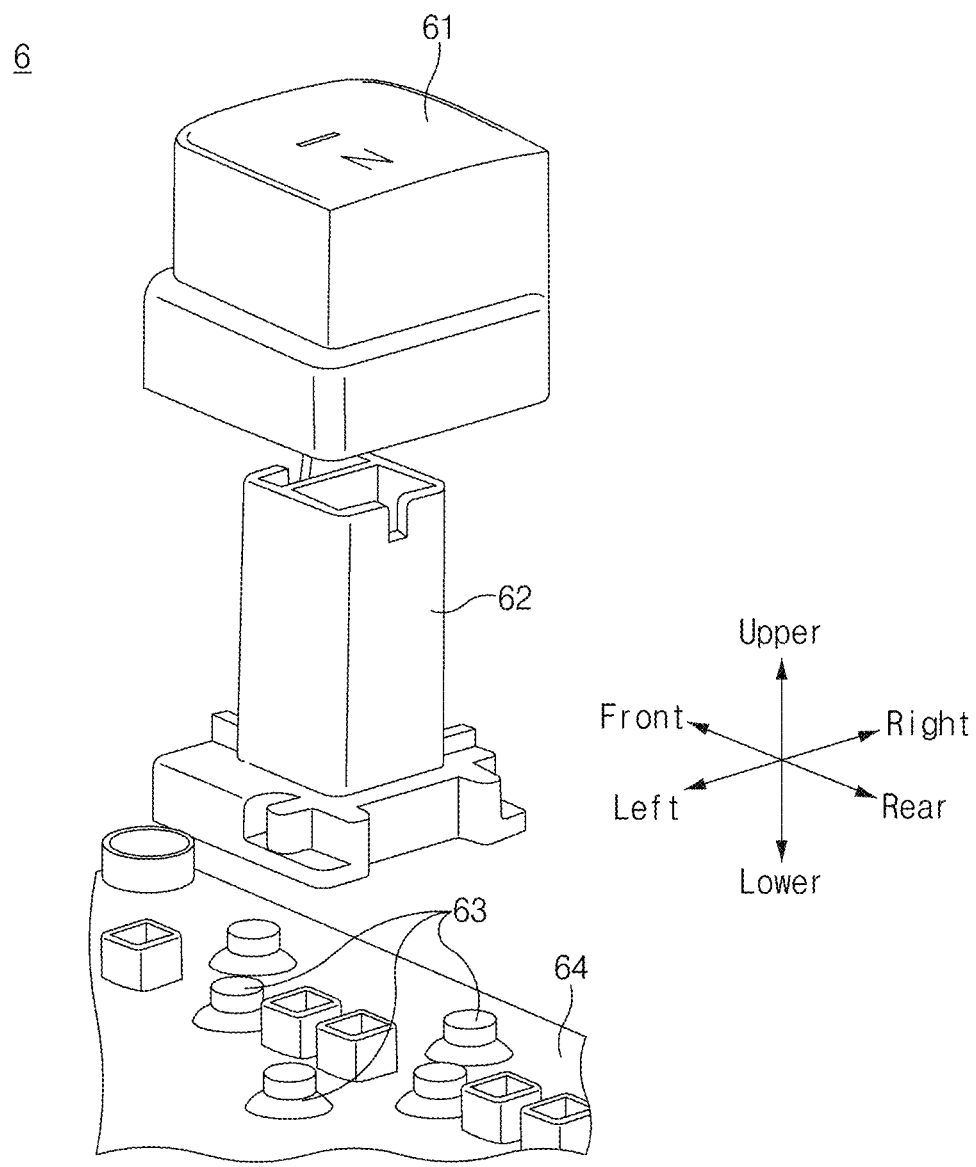
FIG. 2 is a view illustrating an N-gear switch of FIG. 1.

FIG. 2 is a view illustrating the N-gear switch of FIG. 1.

The N-gear switch 6 may include an N-gear button cap 61, an N-gear button guide 62, N-gear rubber domes 63, and an N-gear substrate 64.

The N-gear button cap 61 may be installed in the housing 3 such that the N-gear button cap 61 is exposed above the housing 3 for a push operation.

The N-gear button guide 62 may be vertically combined with the N-gear button cap 61 and may be installed in the housing 3 so as to be slidable by pushing the N-gear button cap 61.

The housing 3 may include a guide hole or a guide groove for guiding the sliding of the N-gear button guide 62.

The N-gear button guide 62 may include a guide protrusion or a guide protruding line that is inserted into the guide hole or the guide groove formed in the housing 3.

For example, the N-gear button guide 62 may slide in the vertical direction. An oblique push operation inclined at a predetermined angle with respect to the vertical direction, as well as a vertical push operation, may be applied to the N-gear button cap 61. Even in this case, the N-gear button guide 62 may be vertically moved.

The combination of the N-gear button cap 61 and the N-gear button guide 62 may be referred to as an N-gear button assembly 61 and 62.

The N-gear switch 6 may include the N-gear rubber domes 63 that are compressively deformed by pushing the N-gear button assembly 61 and 62.

The N-gear rubber domes 63 are parts deformed when being pressed. Therefore, the N-gear rubber domes 63 may be referred to as what are called push deformation parts.

Each of the N-gear rubber domes 63 may include contact portions (not illustrated) that conducts electricity when the N-gear rubber domes 63 are compressively deformed.

When the N-gear button assembly 61 and 62 is pushed, the N-gear rubber domes 63 may be compressively deformed and the contact portions may conduct electricity to generate an electrical signal.

Referring to FIG. 2, three N-gear rubber domes 63 may be provided to ensure signal stability. Among the three N-gear rubber domes 63, one rubber dome may be disposed in front, and the remaining two rubber domes may be disposed behind the rubber dome ahead. The two rubber domes behind may have bilateral symmetry with respect to a virtual line passing through the rubber dome ahead and extending in the fore/aft direction.

The shift-by-wire shifting control apparatus 1 may be configured such that a signal for gear shifting to N is generated when at least two of the contact portions in the N-gear rubber domes 63 arranged as described above conduct electricity.

The N-gear rubber domes 63 may be disposed on the N-gear substrate 64. The N-gear substrate 64 may be integrated with the N-gear rubber domes 63. For example, the N-gear substrate 64 may include a membrane integrated with the N-gear rubber domes 63.

The D-gear switch 5 and the P-gear switch 7 may have the same configuration as, or a configuration similar to, that of the N-gear switch 6. That is, the D-gear switch 5 and the P-gear switch 7 may include a button assembly that is moved by a push operation and rubber domes that are compressively deformed by pushing the button assembly, and may be configured such that, when the rubber domes are compressively deformed, contact portions in the rubber domes conduct electricity to generate a signal for gear shifting.

FIGS. 3 to 6 are views illustrating the R-gear switch of FIG. 1.

Unlike the above-described N-gear switch 6, the R-gear switch 10 may be pressed stepwise.

The R-gear switch 10 may be movable between a first position and a second position. The R-gear switch 10 may be pushed by a first pressing force to move from the first position to a third position between the first and second positions and may be pushed by a second pressing force greater than the first pressing force to move from the third position to the second position.

Accordingly, the R-gear switch 10 may provide a feeling of operation in two steps. As a result, the R-gear switch 10 may provide a different feeling of operation to a user than the other switches including the N-gear switch 6, thereby preventing the R-gear switch 10 from being incorrectly operated.

Specifically, the R-gear switch 10 may include an R-gear button cap 11, an R-gear button guide 12, an R-gear rubber dome 13, and a bridge 15.

The R-gear button cap 11 may be installed in the housing 3 such that the R-gear button cap 11 is exposed above the housing 3 for a push operation.

The R-gear button guide 12 may be vertically combined with the R-gear button cap 11. The R-gear button guide 12 may be installed in the housing 3 so as to be slidable by pushing the R-gear button cap 11.

The R-gear button guide 12 may include a button guide body 121 and a button guide protruding end 122.

The button guide body 121 may have a polygonal prism shape that extends in the vertical direction. The button guide body 121 may have a groove or a hole formed in the middle thereof. For example, the button guide body 121 may have a hollow rectangular prism shape.

The button guide body 121 may include one or more coupling protrusions 1211 for coupling the button guide body 121 to the R-gear button cap 11. The button guide body 121 may be combined with the R-gear button cap 11, with a portion of the button guide body 121 inserted into the R-gear button cap 11. At this time, the coupling protrusions 1211 may be engaged with coupling parts on the R-gear button cap 11 to support the coupling of the R-gear button cap 11 and the button guide body 121.

The button guide body 121 may further include one or more guide protrusions 1212. The guide protrusions 1212 may extend on lateral sides of the button guide body 121 in the direction in which the button guide body 121 slides.

The housing 3 may include guide holes or guide grooves to be engaged with the guide protrusions 1212 for guiding the sliding of the R-gear button guide 12. The guide holes or the guide grooves for guiding the sliding of the R-gear button guide 12 may be formed in the switch insertion opening of the housing 3 into which the R-gear button guide 12 is inserted.

The guide protrusions 1212 may be inserted at least partly into the guide holes or the guide grooves formed in the housing 3 to guide the movement of the R-gear button guide 12.

The button guide protruding end 122 may protrude from the button guide body 121 in directions perpendicular to the moving direction of the R-gear button guide 12. The button guide protruding end 122 may protrude from a lower end of the button guide body 121 in the fore/aft directions or in the left/right directions.

The button guide protruding end 122 may function to prevent the combination of the R-gear button cap 11 and the R-gear button guide 12 from being separated from the housing 3.

The housing 3 has the switch insertion opening into which the R-gear button cap 11 and the R-gear button guide body 121 are inserted. The switch insertion opening may include an outside end that is open toward the outside of the housing 3 and an inside end that is open toward the inside of the housing 3.

When the R-gear button cap 11 and the R-gear button guide body 121 move toward the outside of the housing 3, the button guide protruding end 122 may be brought into contact with the inside end of the switch insertion opening and may prevent the R-gear button cap 11 and the R-gear button guide 12 from being separated from the housing 3.

The combination of the R-gear button cap 11 and the R-gear button guide 12 may be referred to as an R-gear button assembly 11 and 12.

The R-gear rubber dome 13 may include first rubber domes 131a and 131b, second rubber domes 132a and 132b, and a third rubber dome 133 that are compressively deformed by pushing the R-gear button assembly 11 and 12.

The rubber domes are compressively deformed when a pressing force is applied thereto and are restored to their original shapes by elasticity when the pressing force is removed. Therefore, the rubber domes may be referred to as what are called push deformation parts. That is, the first, second, and third rubber domes may be referred to as the first, second, and third push deformation parts.

The second rubber domes 132a and 132b may include contact portions (not illustrated), respectively, which conduct electricity when the second rubber domes 132a and 132b are compressively deformed. Various types of conventional rubber domes configured to allow contact portions to conduct electricity when the rubber domes are compressively deformed may be used as the second rubber domes 132a and 132b. The second rubber domes 132a and 132b may be configured such that the contact portions conduct electricity when the second rubber domes 132a and 132b are compressively deformed by a predetermined height or more. That is, the second rubber domes 132a and 132b may be configured such that the contact portions do not conduct electricity until the second rubber domes 132a and 132b are compressively deformed to a predetermined depth or more.

Likewise to the second rubber domes 132a and 132b, the third rubber dome 133 may include a contact portion (not illustrated) that conducts electricity when the third rubber dome 133 is compressively deformed. The third rubber dome 133 may be configured such that the contact portion conducts electricity when the third rubber dome 133 is compressively deformed by a predetermined height or more.

The first rubber domes 131a and 131b, the second rubber domes 132a and 132b, and the third rubber dome 133 may elastically support the R-gear button assembly 11 and 12 to allow the R-gear button assembly 11 and 12 to return to the original position before a push operation is applied. Accordingly, when an external force applied to the R-gear button cap 11 is removed, the R-gear button cap 11 and the R-gear button guide 12 may be restored to the original position by the elastic force of the R-gear rubber dome 13.

Figure 3:
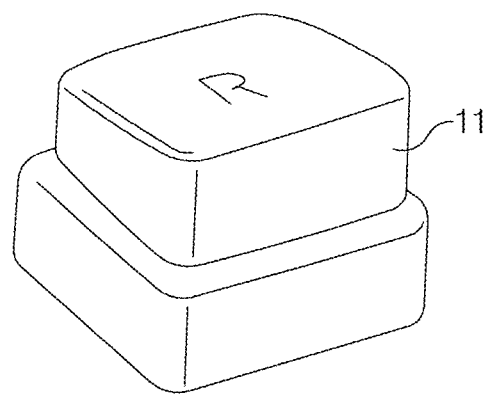
FIGS. 3, 4, 5, and 6 are views illustrating an R-gear switch of FIG. 1.
Figure 3:
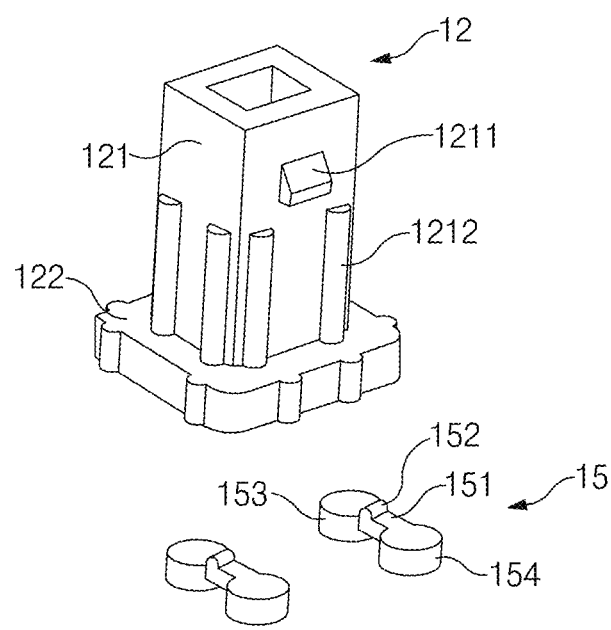
Figure 3:
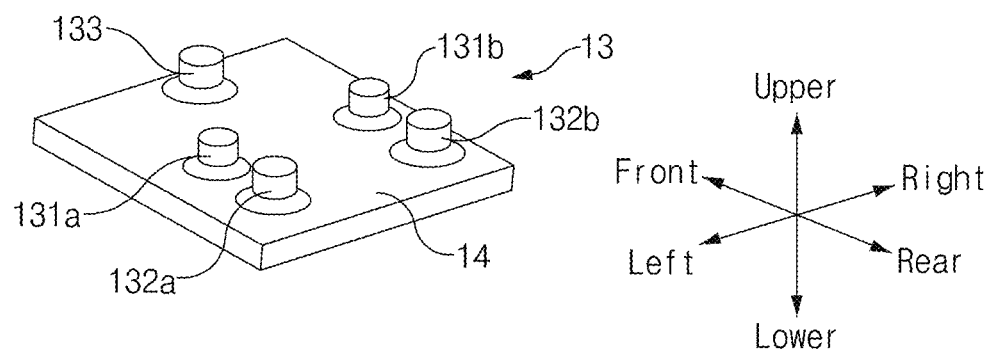
Figure 4:
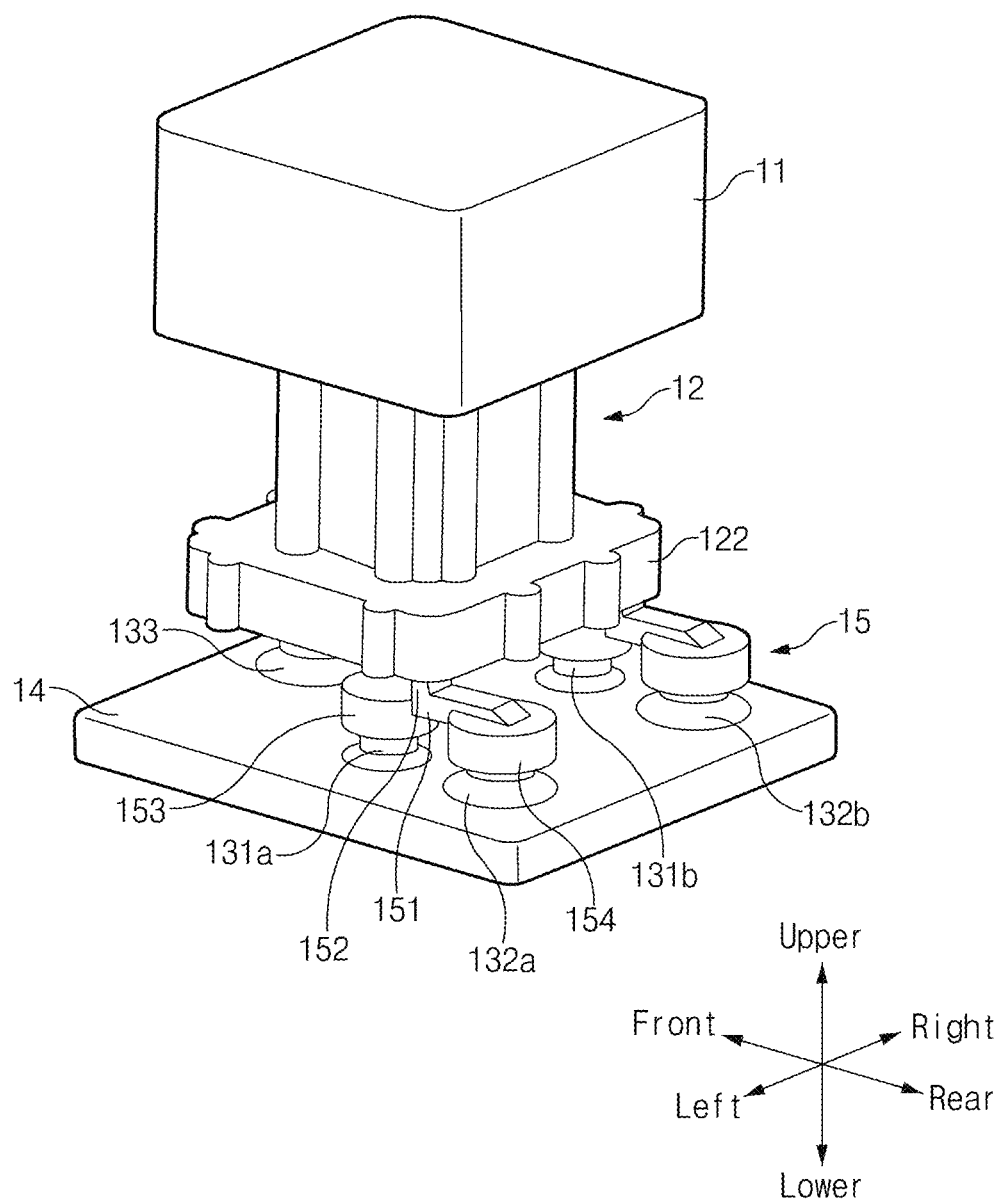
Figure 6:
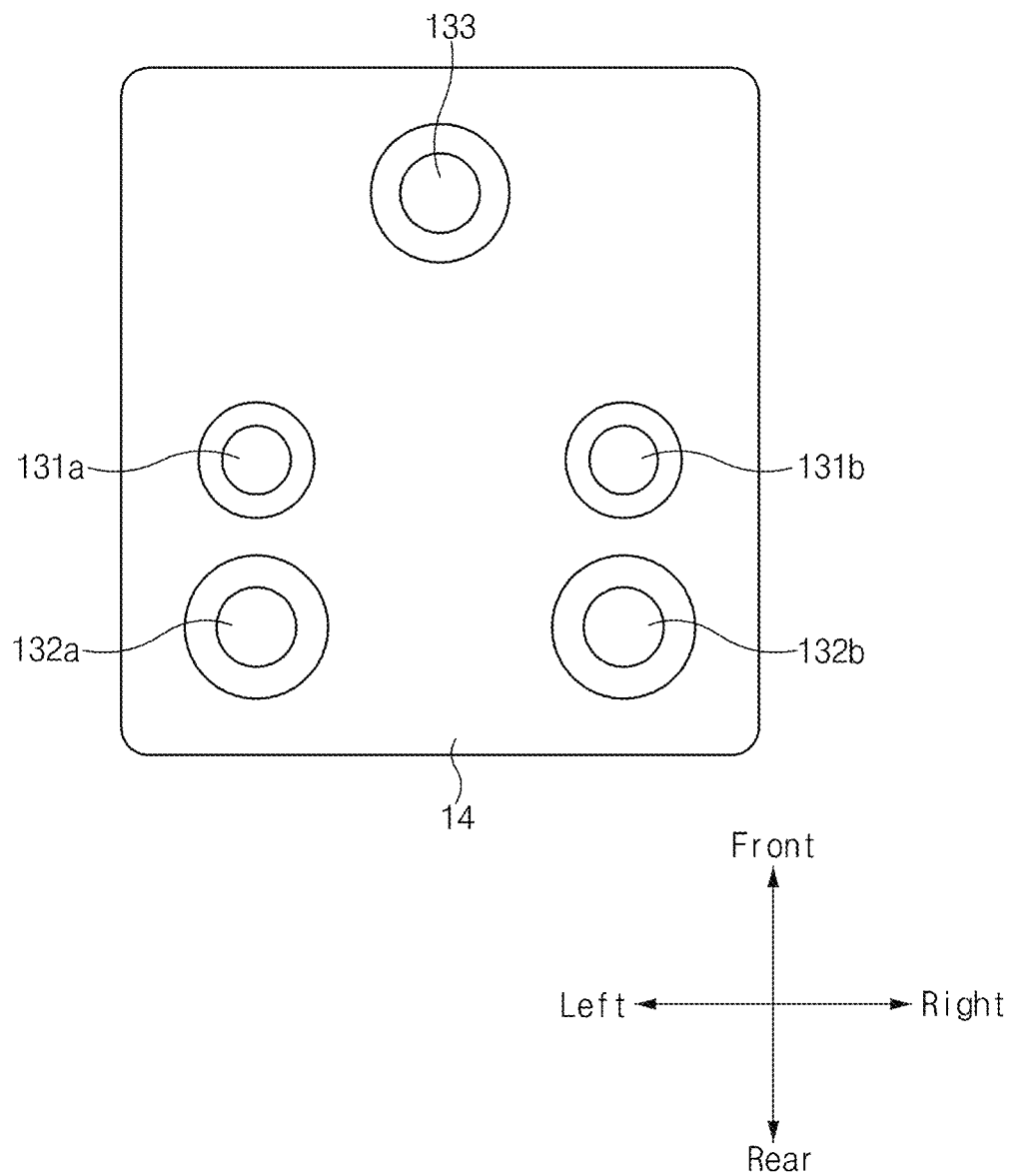

Referring to FIGS. 3 and 6, the third rubber dome 133, the first rubber domes 131a and 131b, and the second rubber domes 132a and 132b may be arranged in sequence from front to rear. Although not illustrated, the third rubber dome 133, the second rubber domes 132a and 132b, and the first rubber domes 131a and 131b may be arranged in sequence from front to rear. In this case, those skilled in the art may appropriately modify and apply the structure to be described below.

The pair of first rubber domes 131a and 131b may have bilateral symmetry with respect to a virtual line passing through the third rubber dome 133 and extending in the fore/aft direction, and the pair of second rubber domes 132a and 132b may have bilateral symmetry with respect to the virtual line.

This is intended to prevent the R-gear button guide 12 from being leaned to a side or caught in a through-hole of the housing 3 when the R-gear button guide 12 is supported upward by the rubber domes.

The R-gear button guide 12 may be elastically supported upward in a horizontal position by the first rubber domes 131a and 131b that have bilateral symmetry, the second rubber domes 132a and 132b that have bilateral symmetry, and the third rubber dome 133.

The first rubber domes 131a and 131b, the second rubber domes 132a and 132b, and the third rubber dome 133 may be disposed on an R-gear substrate 14. The R-gear substrate 14 may be integrated with the first rubber domes 131a and 131b, the second rubber domes 132a and 132b, and the third rubber dome 133. For example, the R-gear substrate 14 may include a membrane integrated with the R-gear rubber dome 13. Furthermore, the R-gear substrate 14 may be connected or integrated with the N-gear substrate 64.

The bridge 15 may transmit a force applied to the R-gear button assembly 11 and 12 to the first rubber domes 131a and 131b and the second rubber domes 132a and 132b.

The bridge 15 may include a bridge body 151 and a bridge protrusion 152.

The bridge body 151 may have one end brought into contact with the first rubber domes 131a and 131b. The bridge body 151 may have an opposite end brought into contact with the second rubber domes 132a and 132b.

The bridge body 151 may include, at the one end, a first rubber dome receiving part 153 into which a portion of each of the first rubber dome 131a and 131b is inserted. The bridge body 151 may include, at the opposite end, a second rubber dome receiving part 154 into which a portion of each of the second rubber domes 132a and 132b is inserted.

The first rubber dome receiving part 153 may correspond to the shape of the first rubber domes 131a and 131b. For example, in the case where the first rubber domes 131a and 131b have a cylindrical shape, the first rubber dome receiving part 153 may have an inner space with a larger diameter than those of the first rubber domes 131a and 131b.

The second rubber dome receiving part 154 may correspond to the shape of the second rubber domes 132a and 132b. For example, in the case where the second rubber domes 132a and 132b have a cylindrical shape, the second rubber dome receiving part 154 may have an inner space with a larger diameter than those of the second rubber domes 132a and 132b.

Accordingly, the bridge 15 may remain coupled with the first rubber domes 131a and 131b and the second rubber domes 132a and 132b, and when the R-gear switch 10 is operated, the bridge 15 may be prevented from being separated from its position and the R-gear switch 10 may be stably operated.

The bridge protrusion 152 may protrude from the bridge body 151 toward the R-gear button guide 12.

The bridge protrusion 152 may extend in the left/right direction such that the bridge protrusion 152 and the R-gear button guide 12 have a contact line extending in the left/right direction, strictly speaking, a contact surface extending in the left/right direction.

When the R-gear switch 10 is pressed, the bridge protrusion 152 is pressed and inclined forward and downward. In the case where the bridge protrusion 152 extends in any direction between the fore/aft direction and the left/right direction rather than in the left/right direction, the bridge protrusion 152 may not be uniformly pressed by the R-gear button guide 12, and therefore the bridge 15 may be inclined to the left or right. That is, the bridge 15 may pitch and roll.

Therefore, the second rubber domes 132a and 132b pressed by the bridge 15 also may not uniformly receive force and may be distorted to the left or right, and signal generation by conduction of electricity by the contact portions may be unstable.

Accordingly, the bridge protrusion 152 may extend in the left/right direction to allow a force transmitted from the R-gear button guide 12 to be uniformly applied to the bridge 15. However, the bridge protrusion 152 does not necessarily have to extend only in the left/right direction and may extend in a direction with the left/right direction as a main component.

The bridge protrusion 152 may be disposed closer to the one end of the bridge body 151 that is brought into contact with the first rubber dome 131a or 131b than the opposite end of the bridge body 151 that is brought into contact with the second rubber dome 132a or 132b.

Accordingly, when the bridge 15 is pressed by the R-gear button guide 12, the first rubber domes 131a and 131b may receive a larger pressing force than the second rubber domes 132a and 132b and may be more easily compressively deformed than the second rubber domes 132a and 132b.

Additionally, in an embodiment, the first rubber domes 131a and 131b may be formed to be more easily compressively deformed than the second rubber domes 132a and 132b. For example, the first rubber domes 131a and 131b may have a lower modulus of elasticity than the second rubber domes 132a and 132b. Therefore, when the same force is applied to the first rubber domes 131a and 131b and the second rubber domes 132a and 132b, the first rubber domes 131a and 131b may be deformed prior to the second rubber domes 132a and 132b.

Accordingly, when the R-gear button assembly 11 and 12 is pushed, the first rubber domes 131*a* and 131*b* may be easily deformed more than the second rubber domes 132*a* and 132*b*.

The bridge 15 may include a pair of bridges 15 arranged in the left/right direction. The pair of bridges 15 may be connected to the pair of first rubber domes 131*a* and 131*b* arranged in the left/right direction and the pair of second rubber domes 132*a* and 132*b* arranged in the left/right direction.

Accordingly, elastic forces of the first rubber domes 131*a* and 131*b* and the second rubber domes 132*a* and 132*b* may be transmitted to the R-gear button assembly 11 and 12 in bilateral symmetry, and the R-gear button assembly 11 and 12 may be elastically supported upward without leaning to the left or right.

Figure 5:
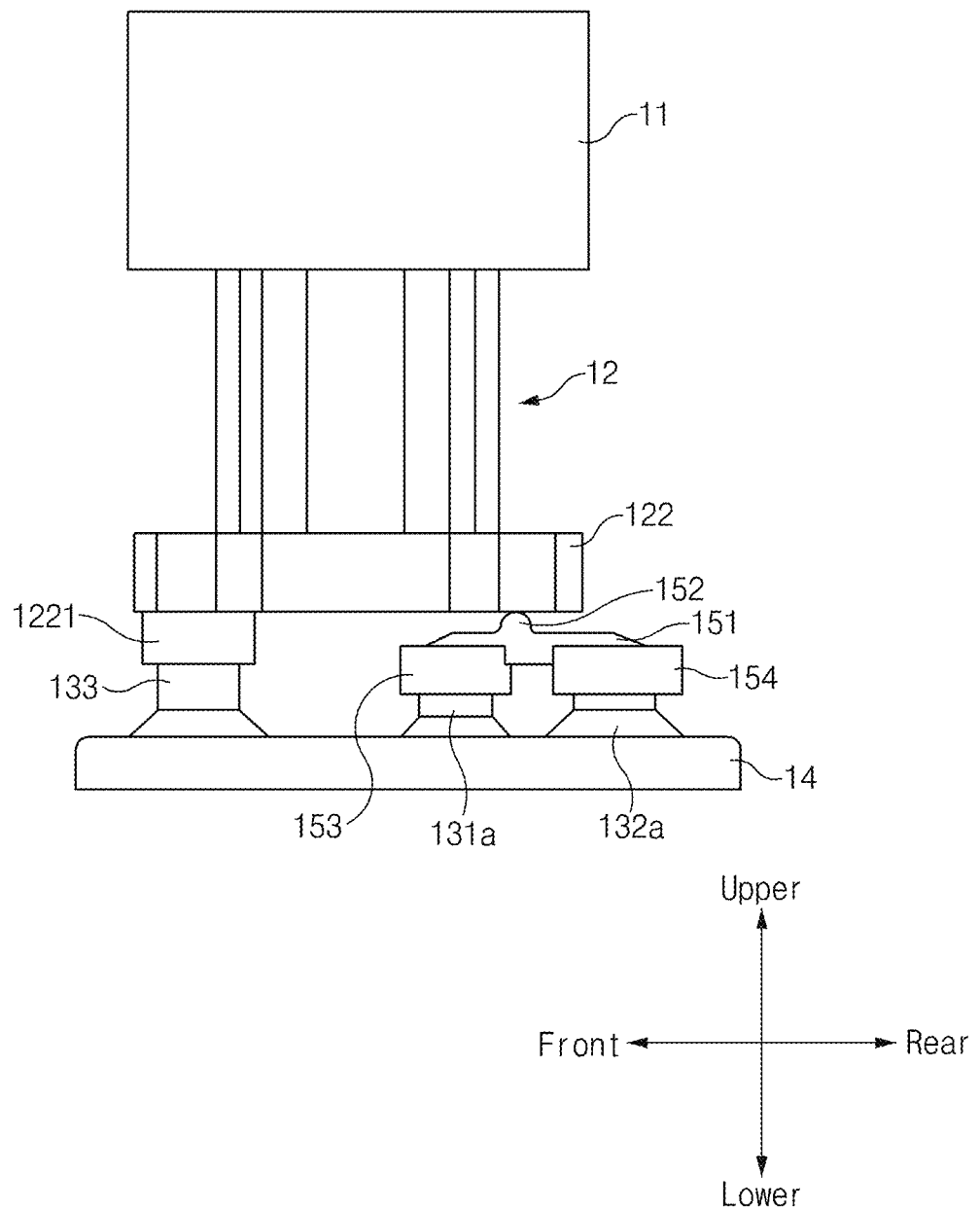

Referring to FIG. 5, the button guide protruding end 122 may include a third rubber dome receiving part 1221. The third rubber dome receiving part 1221 may extend downward from the bottom of the button guide protruding end 122.

The third rubber dome 133 may be coupled to the R-gear button guide 12, with a portion of the third rubber dome 133 inserted into the third rubber dome receiving part 1221.

The above-configured R-gear switch 10 has a feature wherein when a first pressing force is applied to the R-gear button assembly 11 and 12, the first rubber domes 131*a* and 131*b* are compressively deformed, but the second rubber domes 132*a* and 132*b* are not compressively deformed to the extent to which the contact portions conduct electricity, and when a second pressing force greater than the first pressing force is applied to the R-gear button assembly 11 and 12, the second rubber domes 132*a* and 132*b* are compressively deformed to the extent to which the contact portions conduct electricity.

That is, when the R-gear switch 10 is pushed by a pressure less than a predetermined pressure, the R-gear switch 10 is inserted to a predetermined depth, but no electrical signal is generated, and when the R-gear switch 10 is pushed by a pressure the same as the predetermined pressure or more, the R-gear switch 10 is further inserted and an electrical signal is generated.

The R-gear switch 10 may be configured such that an electrical signal for gear shifting to R is generated when the contact portion in the third rubber dome 133 conducts electricity and at least one of the contact portions in the pair of second rubber domes 132*a* and 132*b* conducts electricity. Accordingly, the stability of the electrical signal may be ensured.

The above-configured R-gear switch 10 may provide a different feeling of operation to a user than the other switches (the N-gear switch 6 and the D-gear switch 5), thereby enabling the user to distinguish the R-gear switch 10 from the other switches with only the feeling of operation.

Accordingly, the shift-by-wire shifting control apparatus 1 may be prevented from being incorrectly operated, and even though the user incorrectly operates the shift-by-wire shifting control apparatus 1, the user may easily recognize the incorrect operation.

Figure 7:
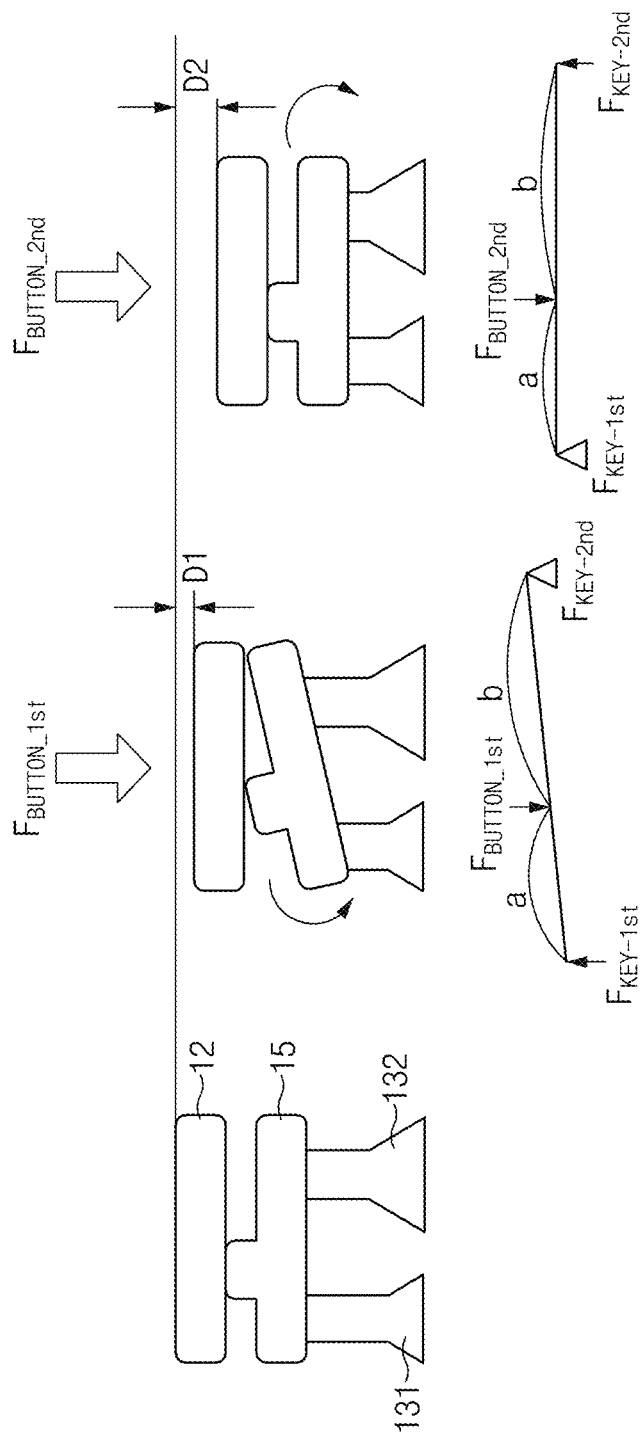
FIGS. 7, 8A, and 8B are views illustrating an operation of the shift-by-wire shifting control apparatus according to the embodiment of the present disclosure.
Figure 8A:
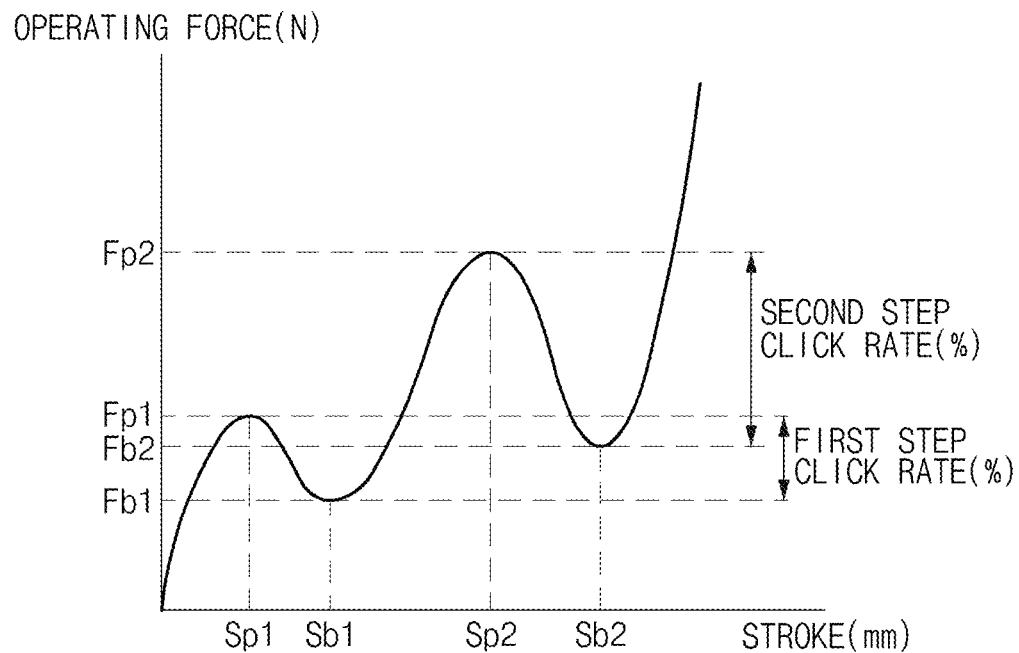
Figure 8B:
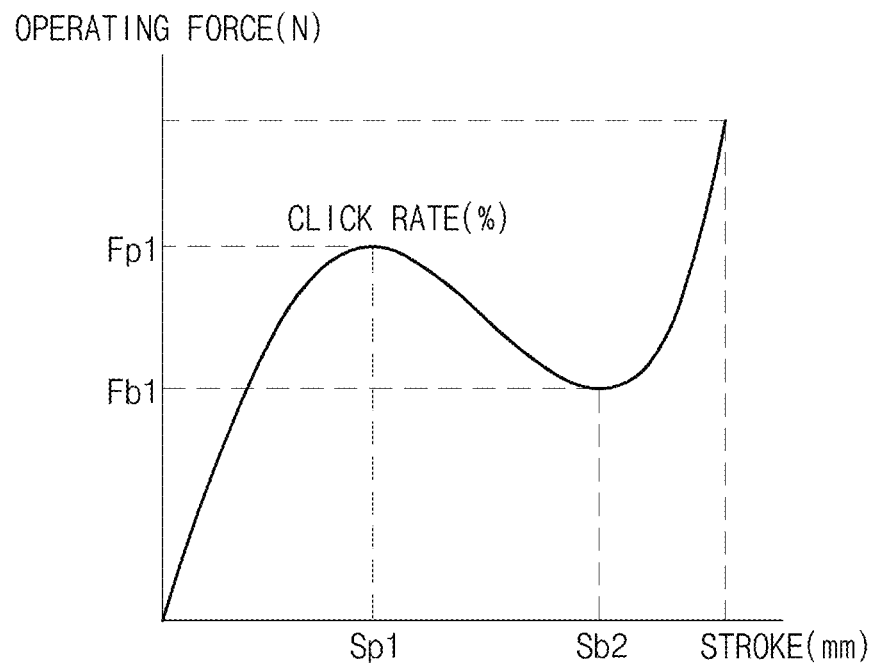

FIGS. 7, 8A, and 8B are views illustrating an operation of the shift-by-wire shifting control apparatus according to the embodiment of the present disclosure.

Hereinafter, an operation of the shift-by-wire shifting control apparatus according to the embodiment of the present disclosure will be described in more detail with reference to FIGS. 7, 8A, and 8B.

FIG. 7 is a schematic diagram of the R-gear switch 10, where FIG. 7 schematically illustrates the coupling relation between a lower end portion of the R-gear button guide 12, the bridge 15, the first rubber domes 131*a* and 131*b*, and the second rubber domes 132*a* and 132*b*.

The leftmost diagram in FIG. 7 illustrates a state in which the R-gear switch 10 is located at the original position before a push operation is applied thereto.

When the R-gear switch 10 is pushed by a first pressing force $F_{BUTTON\_1st}$ as shown in the middle diagram in FIG. 7, the pressing force is transmitted to the first rubber domes 131*a* and 131*b* and the second rubber domes 132*a* and 132*b* by the bridge 15.

Since the bridge protrusion 152 is located closer to the first rubber domes 131*a* and 131*b* than the second rubber domes 132*a* and 132*b*, the first rubber domes 131*a* and 131*b* are more easily deformed than the second rubber domes 132*a* and 132*b* according to the principle of a lever.

When the R-gear switch 10 is pushed by a second pressing force $F_{BUTTON\_2nd}$ as shown in the rightmost diagram in FIG. 7, the pressing force is transmitted to the first rubber domes 131*a* and 131*b* and the second rubber domes 132*a* and 132*b* by the bridge 15, and the second rubber domes 132*a* and 132*b* are compressively deformed.

The reason why the first rubber domes 131*a* and 131*b* are more easily compressively deformed than the second rubber domes 132*a* and 132*b* when the R-gear switch 10 is pushed will be described in more detail with reference to the following equations.

$$\Sigma M_1 = -(F_{KEY\_1st}) \cdot (a+b) + (F_{BUTTON\_1st}) \cdot (b) = 0 \quad \text{Equation 1}$$

$$\Sigma M_2 = -(F_{BUTTON\_2nd}) \cdot (a) + (F_{KEY\_2nd}) \cdot (a+b) = 0 \quad \text{Equation 2}$$

Equations 1 and 2 are momentum equilibrium equations for the bridge 15. For the sake of description, the pressing force that has to be applied to the R-gear switch 10 to compressively deform the first rubber domes 131*a* and 131*b*, the pressing force that has to be applied to the R-gear switch 10 to compressively deform the second rubber domes 132*a* and 132*b*, the elastic force of the first rubber domes 131*a* and 131*b*, and the elastic force of the second rubber domes 132*a* and 132*b* are referred to as $F_{BUTTON\_1st}$, $F_{BUTTON\_2nd}$, $F_{KEY\_1st}$ and $F_{KEY\_2nd}$, respectively.

Equation 1 is a momentum equilibrium equation in the state in which the pressing force applied to the bridge 15 and the elastic force $F_{KEY\_1st}$ of the first rubber domes 131*a* and 131*b* are in equilibrium right before the first rubber domes 131*a* and 13*b* are compressively deformed. Equation 3 may be obtained by arranging Equation 1.

$$(F_{BUTTON\_1st}) = (F_{KEY\_1st}) \cdot (a+b)/b \quad \text{Equation 3}$$

Equation 2 is a momentum equilibrium equation in the state in which the pressing force applied to the bridge 15 and the elastic force $F_{KEY\_2nd}$ of the second rubber domes 132*a* and 132*b* are in equilibrium right before the second rubber domes 132*a* and 132*b* are compressively deformed. Equation 4 may be obtained by arranging Equation 2.

$$(F_{BUTTON\_2nd}) = (F_{KEY\_2nd}) \cdot (a+b)/a \quad \text{Equation 4}$$

Assuming that the elastic force $F_{KEY\_1st}$ of the first rubber domes 131*a* and 131*b* are equal to the elastic force $F_{KEY\_2nd}$ of the second rubber domes 132*a* and 132*b* in Equations 3 and 4, Equation 5 may be obtained by arranging Equations 3 and 4.

$$\frac{F_{BUTTON\_2nd}}{F_{BUTTON\_1st}} = \frac{b}{a} > 1 (\because b > a) \qquad \text{Equation 5}$$

From Equation 5, it can be seen that the second pressing force $F_{BUTTON\_2nd}$ required to compressively deform the second rubber domes 132a and 132b is greater than the first pressing force $F_{BUTTON\_1st}$ required to compressively deform the first rubber domes 131a and 131b. Accordingly, when the first pressing force $F_{BUTTON\_1st}$ is applied to the R-gear switch 10, the first rubber domes 131a and 131b are compressively deformed more than the second rubber domes 132a and 132b and the R-gear switch 10 is pushed to a depth of D1, and when the second pressing force $F_{BUTTON\_2nd}$ greater than the first pressing force $F_{BUTTON\_1st}$ is applied to the R-gear switch 10, the second rubber domes 132a and 132b are compressively deformed and the R-gear switch 10 is pushed to a depth of D2.

The protruding length of the button guide protruding end 122 and the protruding length of the bridge protrusion 152 may be determined such that the button guide protruding end 122 is not brought into contact with the bridge body 151 when the R-gear switch 10 is pushed to the depth D1.

In the drawing in the middle diagram of FIG. 7, when the first pressing force $F_{BUTTON\_1st}$ is applied to the R-gear switch 10, the first rubber domes 131a and 131b are compressively deformed more than the second rubber domes 132a and 132b, and the R-gear switch 10 is pushed to the depth D1. At this time, one end of the R-gear button guide 12 and one end of the bridge 15 become closer to each other and are likely to be brought into contact with each other.

In this case, the one end of the R-gear button guide 12 may be prevented from being brought into contact with the one end of the bridge 15 by decreasing the length of the button guide protruding end 122 in the left/right direction.

Alternatively, the one end of the R-gear button guide 12 may be prevented from being brought into contact with the one end of the bridge 15 by increasing the height by which the bridge protrusion 152 protrudes.

Referring to FIGS. 8A and 8B, a difference in operation between the R-gear switch 10 and the remaining switches (the N-gear switch 6, the D-gear switch 5, and the P-gear switch 7) may be determined.

Referring to FIG. 8A, the R-gear switch 10 may provide a feeling of operation in stages.

An operating force of Fp1 is required to push the R-gear switch 10 to a depth of Sp1 or more. Due to the nature of the rubber domes, the rubber domes may be compressively deformed in succession by an operating force less than Fp1 after being compressively deformed to a predetermined level or higher.

Accordingly, a user, when operating the R-gear switch 10, may notice that the repulsive force of the switch increases in the depth range of 0 to Sp1 and then decreases in the depth range of Sp1 to Sb1. Consequently, the user may firstly notice a feeling of operation.

Furthermore, an operating force of Fp2 is required to push the R-gear switch 10 to a depth of Sp2 or more.

Accordingly, the user, when operating the R-gear switch 10, may notice that the repulsive force of the switch increases in the depth range of Sb1 to Sp2 and then decreases in the depth range of Sp2 to Sb2. Consequently, the user may secondly notice a feeling of operation.

Referring to FIG. 8B, the N-gear switch 6, the D-gear switch 5, and the P-gear switch 7 may provide a simpler feeling of operation than the R-gear switch 10 since the repulsive forces of the switches increase and then decrease only once.

Since the R-gear switch 10 provides a differentiated feeling of operation than the remaining switches as described above, the shift-by-wire shifting control apparatus 1 according to the present disclosure may prevent the R-gear switch 10 from being incorrectly operated, thereby improving vehicle driving stability.

The shift-by-wire shifting control apparatus of the present disclosure has the following advantageous effects:

First, the R-gear switch provides a different feeling of operation than the N-gear switch and the D-gear switch, thereby preventing the shift-by-wire shifting control apparatus from being incorrectly operated.

Second, the R-gear switch includes the first push deformation part compressively deformed when the R-gear switch is pushed by the first pressing force and the second push deformation part compressively deformed when the R-gear switch is pushed by the second pressing force greater than the first pressing force, and the second push deformation part includes the contact portion, whereby a different feeling of operation may be implemented with the simple configuration.

Consequently, the shift-by-wire shifting control apparatus may be prevented from being incorrectly operated, thereby ensuring driving stability of a vehicle that uses the shift-by-wire shifting control apparatus.

Effects of the present disclosure are not limited to the aforementioned effects, and any other effects not mentioned herein will be clearly understood from the accompanying claims by those skilled in the art to which the present disclosure pertains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A shift-by-wire shifting control apparatus for a vehicle, the apparatus comprising:
    a housing; and
    a D-gear switch, an N-gear switch, and an R-gear switch installed in the housing, the D-gear switch corresponding to a drive gear, the N-gear switch corresponding to a neutral gear, and the R-gear switch corresponding to a reverse gear,
    wherein a specific switch that is one of the D-gear switch, the N-gear switch, and the R-gear switch is movable between a first position and a second position,
    wherein the specific switch is movable from the first position to a third position between the first and second positions by a first pressing force and is movable from the third position to the second position by a second pressing force greater than the first pressing force,
    wherein the specific switch includes:
        a button assembly movable by a push operation;
        a first push deformation part compressively deformed by pushing the button assembly;
        a second push deformation part compressively deformed by pushing the button assembly, the second push deformation part including a contact portion configured to conduct electricity upon the compressive deformation of the second push deformation part; and a bridge configured to transmit a force applied to the button assembly to the first and second push deformation parts, wherein the bridge includes:
  a bridge body including one end brought into contact with the first push deformation part and an opposite end brought into contact with the second push deformation part; and
  a bridge protrusion protruding toward the button assembly from the bridge body, and wherein the bridge protrusion is closer to the one end of the bridge body, which is brought into contact with the first push deformation part, than the opposite end of the bridge body, which is brought into contact with the second push deformation part.

2. The apparatus of claim 1,
wherein when the button assembly is pushed by the first pressing force, the first push deformation part is compressively deformed and the second push deformation part is not compressively deformed to a degree to which the contact portion conducts electricity,
wherein when the button assembly is pushed by the second pressing force, the second push deformation part is compressively deformed to the degree to which the contact portion conducts electricity,
wherein the third position is a position of the specific switch in a state in which the first push deformation part is compressively deformed and the second push deformation part is not compressively deformed to the degree to which the contact portion conducts electricity,
wherein the second position is a position of the specific switch in a state in which the first push deformation part is compressively deformed and the second push deformation part is compressively deformed to the degree to which the contact portion conducts electricity, and
wherein a signal for gear shifting to a specific gear corresponding to the specific switch is generated when the contact portion of the second push deformation part conducts electricity.

3. The apparatus of claim 1, wherein the first and second push deformation parts elastically support the button assembly to allow the button assembly to return to the first position.

4. The apparatus of claim 1, wherein the bridge protrusion extends in a direction with a left/right direction as a main component, the left/right direction being perpendicular to an up/down direction in which the bottom assembly moves and a fore/aft direction in which the first and second push deformation parts are arranged.

5. The apparatus of claim 1, wherein the bridge body includes, at the one end, a first receiving part into which a portion of the first push deformation part is inserted and includes, at the opposite end, a second receiving part into which a portion of the second push deformation part is inserted.

6. The apparatus of claim 1, wherein the first push deformation part includes a pair of first push deformation parts arranged in a left-right direction,
wherein the second push deformation part includes a pair of second push deformation parts arranged in the left/right direction,
wherein the bridge includes a pair of bridges arranged in the left/right direction, and
wherein the button assembly is brought into contact with the pair of bridges.

7. The apparatus of claim 6, wherein the specific switch further includes:
  a third push deformation part disposed ahead of the first and second push deformation parts and compressively deformed by pushing the button assembly, the third push deformation part including a contact portion configured to conduct electricity upon the compressive deformation of the third push deformation part, and
wherein the pair of first push deformation parts have bilateral symmetry with respect to a virtual line passing through the third push deformation part and extending in a fore/aft direction, and the pair of second push deformation parts have bilateral symmetry with respect to the virtual line.

8. The apparatus of claim 7, wherein the signal for gear shifting to the specific gear is generated when the contact portion of the third push deformation part conducts electricity and at least one of contact portions of the pair of second push deformation parts conducts electricity.

9. The apparatus of claim 1, wherein the first and second push deformation parts are configured such that a pressing force required to compressively deform the second push deformation part is greater than a pressing force required to compressively deform the first push deformation part.

10. The apparatus of claim 1, wherein the button assembly includes:
  a button cap exposed outside the housing; and
  a button guide combined with the button cap and installed in the housing so as to be slidable by pushing the button cap.

11. The apparatus of claim 10, wherein one surface of the button cap exposed outside the housing is concave toward a central portion of the button cap.

12. The apparatus of claim 10,
wherein the button guide includes a button guide body and a button guide protruding end protruding from the button guide body in a direction perpendicular to a direction in which the button guide moves, and
wherein the button guide protruding end is brought into contact with the bridge and transmits a pressing force applied to the button cap to the bridge.

13. The apparatus of claim 12,
wherein a protruding length of the button guide protruding end and a protruding length of the bridge protrusion are determined such that the button guide protruding end is not brought into contact with the bridge body when the specific switch is located in the third position thereof.

14. A shift-by-wire shifting control apparatus for a vehicle, the apparatus comprising:
  a housing; and
  a D-gear switch, an N-gear switch, and an R-gear switch installed in the housing, the D-gear switch corresponding to a drive gear, the N-gear switch corresponding to a neutral gear, and the R-gear switch corresponding to a reverse gear,
wherein a specific switch that is one of the D-gear switch, the N-gear switch, and the R-gear switch is movable between a first position and a second position,
wherein the specific switch is movable from the first position to a third position between the first and second positions by a first pressing force and is movable from the third position to the second position by a second pressing force greater than the first pressing force,
wherein the specific switch includes:
  a button assembly movable by a push operation;

a first push deformation part compressively deformed by pushing the button assembly;

a second push deformation part compressively deformed by pushing the button assembly, the second push deformation part including a contact portion configured to conduct electricity upon the compressive deformation of the second push deformation part; and a bridge configured to transmit a force applied to the button assembly to the first and second push deformation parts, wherein the bridge includes:

a bridge body including one end brought into contact with the first push deformation part and an opposite end brought into contact with the second push deformation part; and a bridge protrusion protruding toward the button assembly from the bridge body, and wherein the bridge body includes, at the one end, a first receiving part into which a portion of the first push deformation part is inserted and includes, at the opposite end, a second receiving part into which a portion of the second push deformation part is inserted.

15. A shift-by-wire shifting control apparatus for a vehicle, the apparatus comprising:

a housing; and a D-gear switch, an N-gear switch, and an R-gear switch installed in the housing, the D-gear switch corresponding to a drive gear, the N-gear switch corresponding to a neutral gear, and the R-gear switch corresponding to a reverse gear, wherein a specific switch that is one of the D-gear switch, the N-gear switch, and the R-gear switch is movable between a first position and a second position, wherein the specific switch is movable from the first position to a third position between the first and second positions by a first pressing force and is movable from the third position to the second position by a second pressing force greater than the first pressing force wherein the specific switch includes:

a button assembly movable by a push operation;

a first push deformation part compressively deformed by pushing the button assembly; and a second push deformation part compressively deformed by pushing the button assembly, the second push deformation part including a contact portion configured to conduct electricity upon the compressive deformation of the second push deformation part, wherein the button assembly includes:

a button cap exposed outside the housing; and a button guide combined with the button cap and installed in the housing so as to be slidable by pushing the button cap, wherein the specific switch further includes:

a bridge configured to transmit a force applied to the button assembly to the first and second push deformation parts, wherein the button guide includes a button guide body and a button guide protruding end protruding from the button guide body in a direction perpendicular to a direction in which the button guide moves, and wherein the button guide protruding end is brought into contact with the bridge and transmits a pressing force applied to the button cap to the bridge, wherein the bridge includes:

a bridge body having one end brought into contact with the first push deformation part and an opposite end brought into contact with the second push deformation part; and a bridge protrusion protruding toward the button assembly from the bridge body, and wherein a protruding length of the button guide protruding end and a protruding length of the bridge protrusion are determined such that the button guide protruding end is not brought into contact with the bridge body when the specific switch is located in the third position thereof.

* * * * *